United States Patent
Fish et al.

(10) Patent No.: US 7,138,454 B2
(45) Date of Patent: Nov. 21, 2006

(54) TOUGHENED, GLASS FILLED POLYAMIDE COMPOSITIONS AND BLENDS HAVING IMPROVED STIFFNESS, AND ARTICLES MADE THEREFROM

(75) Inventors: Robert B. Fish, Parkersburg, WV (US); Win-Chung Lee, Parkersburg, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 238 days.

(21) Appl. No.: 10/655,408

(22) Filed: Sep. 4, 2003

(65) Prior Publication Data

US 2004/0087706 A1    May 6, 2004

Related U.S. Application Data

(60) Provisional application No. 60/408,776, filed on Sep. 6, 2002.

(51) Int. Cl.
*C08L 77/00* (2006.01)

(52) U.S. Cl. ..................... 524/514; 524/512

(58) Field of Classification Search ............... 524/494, 524/512–513, 514
See application file for complete search history.

(56) References Cited

U.S. PATENT DOCUMENTS

| | | | |
|---|---|---|---|
| 5,288,523 A * | 2/1994 | Klaiber et al. ........... | 427/385.5 |
| 5,770,654 A | 6/1998 | Blatz | |
| 2005/0004308 A1* | 1/2005 | Lee et al. .................. | 525/100 |
| 2005/0032950 A1* | 2/2005 | Lee et al. .................. | 524/261 |

FOREIGN PATENT DOCUMENTS

| WO | WO 95/10561 | 4/1995 |
|---|---|---|
| WO | WO 02/12356 | 2/2002 |

OTHER PUBLICATIONS

"Morphology and Mechanical Properties of Nylon 6 Toughened with Wast Poly(vinyl butyral) film",Journal of Applied Polymer Science (1998), pp. 1531-1540, Yoon-Jong Cha, Chang-Hee Lee, Soonja Choe.

"Miscibility of Polyvinyl Butyral/Nylon 6 Blends", Polymer 41, 2000, 6671-6678, H. K. Jeong, M. Rooney, D.J. Dvid, W.J. MacKnight, F.E. Karasz, T. Kajiyama.

* cited by examiner

*Primary Examiner*—Peter Szekely

(57) ABSTRACT

Polyamide compositions and blends toughened with polyvinylbutyral and containing glass fiber are disclosed, together with articles of manufacture. These materials may also contain non-reactive polymers and antioxidants.

7 Claims, No Drawings

TOUGHENED, GLASS FILLED POLYAMIDE COMPOSITIONS AND BLENDS HAVING IMPROVED STIFFNESS, AND ARTICLES MADE THEREFROM

CROSS REFERENCE TO RELATED APPLICATION

This application claims the benefit of U.S. Provisional Application No. 60/408,776 filed Sep. 6, 2002.

FIELD OF THE INVENTION

The present invention relates to polyamide compositions and blends incorporating free-flowing toughener and glass fiber and exhibiting excellent stiffness. More particularly, the present invention relates to such compositions and blends, processes for the manufacture of such materials, and molded articles.

BACKGROUND OF THE INVENTION

It is well known that toughening agents such as grafted rubbers can be employed to improve the toughness of polyamides. See generally, U.S. Pat. No. 4,174,358 assigned to E.I. DuPont de Nemours & Co. It is also well known that glass fibers can be incorporated into such polyamide blends to increase their stiffness. Such a product has been available from DuPont for a number of years, under the name ZYTEL® 80G33HS1L BK104. It is also well known that plasticized polyvinylbutyral can be used as a toughener in, for example, 6-nylon. See generally, U.S. Pat. No. 5,770,654 also assigned to E.I. DuPont de Nemours & Co and directed to such compositions suitable for a variety of applications where good toughness is required, as in packaging subjected to rough handling. As used herein polyvinylbutyral is abbreviated as "PVB".

Plasticized PVB can be difficult to handle as a feed to a compounding extruder due to its inherent stickiness. Similarly PVB sheet is a material that can be difficult to work with because of the tendency to adhere to itself. Sheets of PVB can stick together, or bind, with such strength that it is very difficult to separate the layers. The irreversible nature of this self-adhesion by PVB is referred to in the art of PVB manufacture as "blocking". Once PVB "blocks", process difficulties are encountered. This tendency to block can make manufacturing processes that incorporate PVB unnecessarily complex and difficult. Consequently, continuous processes in which PVB is handled either in sheet form or in small shredded pieces can be very expensive to run, and therefore are not practical.

Moreover, blends of PVB sheet or small shredded pieces with other materials can block in the same manner as homogenous PVB compositions. Such blends of PVB with other polymers can be difficult to obtain in a cost-effective manner. A preferred process for preparing blends of PVB with other polymers would utilize conventional loss-in-weight screw feeders, which are found throughout that industry.

Recent work in the field indicates that blends of PVB with polyethylene and grafted rubbers are sufficiently non-sticky that they can be fed into a compounding extruder. See for example, WO 02/12356 of E.I. DuPont de Nemours & Co., directed to a process for preparing pellets from PVB scrap material.

It is an object of the present invention to provide PVB-toughened, glass filled polyamides that are suitable for conventional processing techniques. A feature of the invention is usefulness in fabricating a wide range of molded articles. It is an advantage of the present invention to provide polyamide-based compositions and blends that resist blocking, making them more attractive candidates for commercial applications. These and other objects, features and advantages of the present invention will become better understood upon having reference to the following description of the invention herein.

SUMMARY OF THE INVENTION

There is disclosed and claimed herein thermoplastic polyamide compositions comprising:

A. 5 to 30 weight percent free-flowing toughener comprising about 20 weight percent to about 95 weight percent polyvinyl butyral;

B. 10 to 45 weight percent glass fiber; and

C. complimentally, 85 to 25 weight percent polyamide having a melting point below about 230° C. and a number average molecular weight of at least 5,000.

DETAILED DESCRIPTION OF THE INVENTION

The compositions and blends of this invention are typically prepared by production of a free-flowing toughener followed by blending of that toughener with nylon, glass fiber and other ingredients to produce a toughened glass-filled polyamide blend. The following description first addresses the production of the toughener followed by production of the polyamide blend.

Process for Producing Toughener

The first, essential component of the toughener is plasticized PVB. PVB is a commercially available product useful for imparting shatter-resistance to glass in myriad applications, among them windshields for automobiles and window glass in homes and buildings. The preparation of PVB is a well-known reaction between aldehyde and alcohol in an acid medium. The plasticizer used is also a commercially available chemical such as diester of aliphatic diols with alipatic carboxylic acids, e.g. tri-ethylene glycol di-2-ethylhexoate (3GO), or tetra-ethylene glycol di-n-heptanoate (4G7). Virgin plasticized PVB is commercially available from DuPont as BUTACITE® Interlayer.

Of course, those having skill in the field to which this invention pertains will readily recognize that PVB can be obtained from any number of sources. These include virgin plasticized PVB, scrap PVB, edge trim PVB from safety or architectural glass manufacturing operations, PVB recovered from scrap automotive glass, and other similar sources or mixtures of these sources. Any of these sources can be satisfactorily used without departing from the spirit and scope of this invention.

A second, optional component can be monomeric or polymeric materials or a mixed composition. Preferably the second component is a polymer composition that includes anhydride functionality, such as is available commercially from E.I. DuPont de Nemours and Company under the Fusabond® brand name, or carboxylic acid functionality. Fusabond® polymers are polyolefins having anhydride functionality.

A third, optional component can be a non-reactive polymer such as polyethylene, polypropylene, polyvinylchloride, nylon, olefinic copolymers such as acid copolymers, other thermoplastic materials, or mixtures thereof.

An antioxidant is not required, however one is preferred. If included, the antioxidant can be present in an amount of at least about 0.1% by weight.

In a preferred embodiment, plasticized PVB and three other ingredients (Fusabond®, a non-reactive polymer such as Sclair®, HiVal®, or Elvaloy®, and an antioxidant) are mixed in a batch process or a continuous process at elevated temperature ranging from 100° C. to 260° C., preferably at 150° C. to 220° C. to provide a homogeneous melt blend. This blend is dropped to a set of roll mills to mix further and press it into sheet form. A strip of the sheet is continuously fed to an extruder through a belt feeder. In the extruder, the mixture is melted again and pushed through a melt filter to remove any solid contamination. The clean melt is distributed to a die with multiple holes. An under water face cutter cuts those polymers from die face into pellets. The water quenches those pellets while cutting and carries them into a screen to separate them from the bulk water. Wet pellets are dried in a fluidized dryer before pack-out.

Toughened Polyamide Blends

While introduction of grafted rubbers increases the toughness of polyamides, such materials also decrease the stiffness of the resin. Table 1 compares the literature values of stiffness and toughness of two commercial engineering polymers to illustrate this effect. Note how the properties of DuPont's ZYTEL® 70G33HS1L BK031R, a commercial 33% glass reinforced resin, compare with ZYTEL® 80G33HS1L BK104, a resin with the same glass level but with toughener added. While the toughness, measured by the notched Izod test is significantly increased, the stiffness, measured by the flexural modulus test, is significantly reduced. There is an apparent and long felt need to achieve higher toughness levels but without sacrificing stiffness properties. However, this tradeoff between toughness and stiffness was thought to be intractable until now.

TABLE 1

Comparison of stiffness of a standard and a toughened glass reinforced nylon resin
(Source: DuPont Product Literature Sheets)

| Resin | Composition | Notched Izod at 23° C., DAM (kJ/m2) | Flexural Modulus, DAM, (mPa) |
|---|---|---|---|
| ZYTEL® 70G33HS1L BK031R | 33% glass reinforced heat stabilized black 66 nylon resin | 11 | 9100 |
| ZYTEL® 80G33HS1L BK104 | 33% glass reinforced toughened heat stabilized black 66 nylon resin | 20 | 7500 |

Although the '654 patent teaches that plasticized polyvinylbutyral would be useful to toughen, for example, 6-nylon, and WO 02/12356 developed an approach to make such materials more useable, neither addresses the problem of toughening glass-reinforced polyamides using these materials.

A major commercial use for plasticized polyvinylbutyral is as a safety interlayer in automotive window glass and its adhesion to glass is a prime in-use property. In the present invention this property of plasticized polyvinylbutyral has been identified as making it especially useful as a toughener for glass-reinforced polyamides.

EXAMPLES

Examples 1–7

Showing Preparation of the Free-Flowing Toughener

The Examples are presented for illustrative purposes only, and not intended to limit the scope of the present invention in any way. Plasticized PVB used in the Examples was windshield edge trim.

Examples 1–3

Three non-blocking pellet samples (A, B, & C) were prepared using the amounts shown in Table 2.

TABLE 2

Example Recipes for Preparation of Free-flowing Tougheners A to C

| | Blending Composition (pph: part per hundred) | | | | Physical Property | | |
|---|---|---|---|---|---|---|---|
| Sample | Plasticized PVB | Fusabond® | Polymer Additive | Irganox 1010 | Melt Flow Rate (190c/2.16 Kg) | Density | Hardness Shore A @ 0 Sec |
| A | 100 | TRX 202: 5.0 | Sclair® 2909: 10.0 | 0.1 | 2.6 | 1.056–1.061 | 83–84 |
| B | 100 | P MD353D: 5.0 | HiVal® 2 512: 10.0 | 0.1 | 2.8 | 1.046–1.061 | 82 |

TABLE 2-continued

Example Recipes for Preparation of Free-flowing Tougheners A to C

| | Blending Composition (pph: part per hundred) | | | | Physical Property | | |
|---|---|---|---|---|---|---|---|
| Sample | Plasticized PVB | Fusabond ® | Polymer Additive | Irganox 1010 | Melt Flow Rate (190c/2.16 Kg) | Density | Hardness Shore A @ 0 Sec |
| C | 100 | A MG-423D: 5.0 | Elvaloy ® 441: 10.0 | 0.1 | 1.9 | 1.058–1.065 | 80–83 |

Plasticized PVB: Windshield edge trim
Fusabond ® TRX 202: high density polyethylene/1.2% maleic anhydride graft
Fusabond ® A MG-423D: ethylene/alkyl acrylate/CO 25 copolymer modified with 1% maleic anhydride graft
Fusabond ® P MD353D: polypropylene with 1.4% maleic anhydride graft
Sclair ® 2909: Polyethylene
HiVal ® 2512: Polypropylene
Elvaloy ® 441: ethylene/n-butyl acrylate/CO terpolymer
Irgonox ® 1010: An antioxidant
All of the above materials are commercial products available as follows: HiVal ® from Ashland Specialty Chemical Company, Irgonox ® from Ciba-Geigy, and the balance of materials from E.I. DuPont de Nemours and Company For each of the above compositions in Table 2, a total of 150 lb of mixture was dropped in an 80 Liter Banbury Batch Mixer with Ribbon Blender inside. After 2 to 8 minutes under intensive mixing by the Ribbon Blender to melt blend all components, the batch temperature reached 165° to 190° C. before dropping to a set of roll mills. The mixture was further mixed in the rolls while pressed into sheet form. A 4 to 5 inch wide strip was cut from the roll. This strip was continuous fed to an extruder through a belt feeder or directly. In the extruder, the mixture was melted again and pushed through a melt filter to remove any solid contamination. The clean melt was distributed to a die with multiple holes. An under water face cutter cuts those polymers from die face into pellets. The water quenched those pellets while cutting and carried them into a screen to separate them from the bulk water. Wet pellets were dried in a fluidized dryer before pack-out. Physical properties of those pellets, such as Density, Melt Flow Rate at 190° C. of 2.16 K-Gram, Shore A Hardness at 0 second were measured and included in Table 2.

Blocking Test & Results

About 20 gm of sample from each of A, B, & C, respectively, was pressed at 180° C. into a 1/16"×3"×9" plaque. The plaque was cut into three 3"×3" squares. One square was placed on top of a second square. In addition, a 3"×1" Mylar® non-stick film was sandwiched at one edge with ¼" between the above two squares. A 1"×3" 45-gram weight was placed on the top layer with a second Mylar® non-stick film underneath the weight to prevent sticking of the weight to the sample. The whole sample was placed on an aluminum pan with a third Mylar® non-stick film between the pan and the bottom of the square to prevent sticking of the square sample to the pan. After the entire set up was exposed to relative humidity of 50% at 23° C. overnight, the weight was removed. The top square was pulled by grabbing the top square sample and the first and second Mylar® non-stick films with one hand while the bottom square sample and the third Mylar® non-stick film was holding down on the pan. The difficulty/easiness of the pulling was recorded and rated as 0 to 5 (using the ratings criteria as defined herein) versus a control made from 100% windshield edge trim in the following Table 3.

After the pulling test, the entire set up was put back in a vacuum oven under nitrogen at 36° to 41° C. overnight. After cooling, the same pulling procedures were repeated and the difficulty/easiness of the pulling was rated and recorded in Table 3.

All the procedures were repeated for the third time but the vacuum oven temperature was set at 46 to 50° C. overnight.

TABLE 3

Blocking Tests with Free-flowing Tougheners A to C

| | Blocking Rating | | | Blocking Description | | |
|---|---|---|---|---|---|---|
| Sample | 23 C. | 36–41 C. | 46–50 C. | 23 C. | 36–41 C. | 46–50 C. |
| A | 4 | 4 | 4 | Difficult to separate | Difficult to separate | Difficult to separate |
| B | 3 | 3 | 3 | Slight difficulty separating | Slight difficulty separating | Slight difficulty separating with moderate sticking at edges |

TABLE 3-continued

Blocking Tests with Free-flowing Tougheners A to C

| | Blocking Rating | | | Blocking Description | | |
|---|---|---|---|---|---|---|
| Sample | 23 C. | 36–41 C. | 46–50 C. | 23 C. | 36–41 C. | 46–50 C. |
| C | 3 | 3 | 3 | Slight difficulty separating | Slight difficulty separating | Slight difficulty separating with moderate sticking at edges |
| Control | 4 | 5 | 5 | Difficult to separate | Could not be separated by hand | Could not be separated by hand |

Control is 100% windshield edge trim and not an example of the present invention.
Ratings: 0–5
0: no blocking
1: the smallest amount of blocking
2: Fairly easily separated by hand
3: Slightly difficult to separate by hand with moderate sticking at edges
4: Highest blocking that is difficult to separate by hand
5: Could not be separated by hand

Examples 4–7

Four additional non-blocking samples (D, E, F, & G) were prepared using the amounts shown in Table 4.

TABLE 4

Free-flowing Tougheners D to G

| | Blending Composition | | | | Physical Property | | |
|---|---|---|---|---|---|---|---|
| | (pph: part per hundred) | | | | Melt Flow | | Hardness |
| Sample | Plasticized PVB + PVB | Fusabond ® | Polymer Additive | Irganox 1010 | Rate (190c/2.16 Kg) | Density | Shore A @ 0 Sec |
| D | 86.3/13.7 | A MG-423D: 5.0 | Elvaloy ® 441: 10.0 | 0.1 | 0.86 | 1.071 | 90 |
| E | 74.8/25.2 | A MG-423D: 5.0 | Elvaloy ® 441: 10.0 | 0.1 | 0.43 | 1.075 | 93 |
| F | 92.5/7.9 | A MG-423D: 5.0 | Elvaloy ® 441: 10.0 | 0.1 | 1.04 | 1.072 | 84 |
| G | 86.3/13.7 (Coarse) | A MG-423D: 5.0 | Elvaloy ® 441: 10.0 | 0.1 | 0.54 | 1.073 | 88 |

Plasticized PVB: Windshield edge trim
PVB: Polyvinylbutyral made by E.I. DuPont de Nemours and Company
Coarse: Coarse particles of polyvinylbutyral made by E.I. DuPont de Nemours and Company
Fusabond ® A MG-423D: ethylene/alkyl acrylate/CO 25 copolymer modified with 1% maleic anhydride graft
Elvaloy ® 441: ethylene/n-butyl acrylate/CO terpolymer
Irgonox ® 1010: An antioxidant
All of the above materials are commercial products available as follows: Irgonox ® from Ciba-Geigy, and the balance from E.I. DuPont de Nemours and Company For each of the above compositions of Table 4, a total of 3 lb of mixture was dropped in a Laboratory Banbury Batch Mixer with Ribbon Blender inside. After 4 minutes under intensive mixing by the Ribbon Blender to melt blend all components, the batch temperature reached 155 to 166° C. before dropping out of the Mixer. After cooling, the sample was cut into smaller pieces for evaluation of physical properties, such as Density, Melt Flow Rate at 190° C. of 2.16 K-Gram, and Shore A Hardness at 0 second included in Table 4.

Blocking Test & Results

About 20 gm of sample from each of D, E, F & G, respectively, was pressed at 180° C. into 1/16"×3"×9" plaque. The plaque was cut into three 3"×3" squares. One square was placed on top of a second square. In addition, a 3"×1" Mylar® non-stick film was sandwiched at one edge with 1/4" between the above two squares. A 1"×3" 45-gram weight was placed on the top layer with a second Mylar® non-stick film underneath the weight to prevent sticking of the weight to the sample. The whole sample was placed on an aluminum pan with a third Mylar® non-stick film between the pan and the bottom of the square to prevent sticking of the square sample to the pan. After the entire set up was exposed to relative humidity of 50% at 23° C. overnight, the weight was removed. The top square was pulled by grabbing the top square sample and the first and second Mylar® non-stick films with one hand while the bottom square sample and the third Mylar® non-stick film was holding down on the pan. The difficulty/easiness of the pulling was recorded and rated as 0 to 5 (using the ratings criteria as defined herein) versus a control made from 100% windshield edge trim in the following Table 5.

After the pulling test, the entire set up was put back in a vacuum oven under nitrogen at 36–41° C. overnight. After cooling, the same pulling procedures were repeated and the difficulty/easiness of the pulling was rated and recorded in Table 5.

All the procedures were repeated for the third time but the vacuum oven temperature was set at 46 to 50° C. overnight.

section except the glass fiber, which was fed into the sixth barrel section by use of a sidefeeder. Extrusion was carried out with a port under vacuum. The screw speed was 250 rpm and the total extruder feed rate was 150 pounds per hour. The resulting strand was quenched in water, cut into pellets, and sparged with nitrogen until cool.

The moisture in the resulting pellets was adjusted to between 0.1% and 0.2% by drying or adding additional water as required. Test bars were molded in an injection molding machine according to ISO methods. The molded bars were tested using the following test procedures in their dry-as-molded state. The data are shown in Table 6.

TABLE 5

Blocking tests with free flowing tougheners D to G

| Sample | Blocking Rating | | | Blocking Description | | |
|---|---|---|---|---|---|---|
| | 23 C | 36–41 C | 46–50 C | 23 C | 36–41 C | 46–50 C |
| D | 2 | 2 | 2 | Separated fairly easily | Easily separated but slight sticking | Easily separated but slight sticking |
| E | 2 | 2 | 3 | Separated fairly easily | Easily separated but slight sticking | Slightly difficult to separate with moderate sticking at edges |
| F | 2 | 2 | 1 | Separated fairly easily | Easily separated but slight sticking | slight sticking at first, then easily separated |
| G | 2 | 1 | 1 | Separated fairly easily | Separated easily | Separated easily |
| Control | 4 | 5 | 5 | Difficult to separate | Could not be separated by hand | Could not be separated by hand |

Control is 100% windshield edge trim and not an example of the present invention.
Ratings: 0–5
0: no blocking
1: the smallest amount of blocking
2: Fairly easily separated by hand
3: Slightly difficult to separate by hand with moderate sticking at edges
4: Highest blocking that is difficult to separate by hand
5: Could not be separated by hand Comparative Example 1 and Example 8

The free flowing toughener was prepared in the manner specified above.

The toughener was melt blended together with nylon-6 (Ultramid B-3, available commercially from BASF Corp.) and glass fiber (PPG 3660, available commercially from PPG Industries). The additives are all commercially available or described herein. The free flowing toughener described above as Sample C was used.

During the operation for melt blending the ingredients were primarily fed through individually controlled loss in weight feeders. However, for ease and control of feeding, the nylon and the low percentage additive ingredients were first dry blended by tumbling in a drum. The mixture was then compounded by melt blending in a 40 mm Werner & Pfleiderer co-rotating twin screw extruder with a barrel temperature about 240° C. and a die temperature of about 250° C. All the ingredients were fed into the first barrel

TABLE 6

Toughened glass-filed nylon blends

| | Comparative Example 1 | Example 8 |
|---|---|---|
| Ultramid B-3 | 51.80% | 51.80% |
| PPG3660 | 33.00% | 33.00% |
| ENGAGE 8180 | 8.55% | 0.00% |
| TRX-301 | 1.90% | 0.00% |
| DDDA | 0.20% | 0.20% |
| Aluminum Distearate | 0.10% | 0.10% |
| FE3800 black color concentrate | 4.45% | 4.45% |
| Free-flowing toughener | 0.00% | 10.45% |
| Notched Izod, DAM, 23° C., kJ/m2 | 18.4 | 12.8 |

TABLE 6-continued

Toughened glass-filed nylon blends

|  | Comparative Example 1 | Example 8 |
|---|---|---|
| Flex Mod, DAM, mPa | 7232 | 8627 |
| Tensile Str, DAM, mPa | 108.1 | 127.6 |

Those skilled in the art will notice the reduction in toughness accepted in order to achieve the higher stiffness. However, those skilled in the art will also appreciate that the percentage of grafted toughened in the toughener could also be increased without departing from the spirit of this invention.

The invention claimed is:

1. A thermoplastic polyamide composition comprising:
   A. 5 to 30 weight percent free-flowing toughener comprising about 20 weight percent to about 95 weight percent plasticized polyvinylbutyral (PVB);
   B. 10 to 45 weight percent glass fiber; and
   C. complimentally, 85 to 25 weight percent polyamide having a melting point below about 230° C. and a number average molecular weight of at least 5,000.

2. The composition of claim 1 wherein said PVB of said toughener (A) is selected from the group consisting of PVB, virgin plasticized PVB, scrap PVB, edge trim PVB, and mixtures thereof.

3. The composition of claim 1 wherein said toughener (A) further comprises one or more polymers having anhydride functionality and/or one or more polymers having carboxylic acid functionality.

4. The composition of claim 1 wherein said toughener (A) further comprises a non-reactive polymer.

5. The composition of claim 4 wherein said non-reactive polymer is selected from the group consisting of polyethylene, polypropylene, polyvinylchloride, olefinic copolymers, and mixtures thereof.

6. The composition of claim 1 further comprising at least 0.1 weight percent of an antioxidant.

7. A molded article made from the composition of claim 1.

* * * * *